Figure 1:
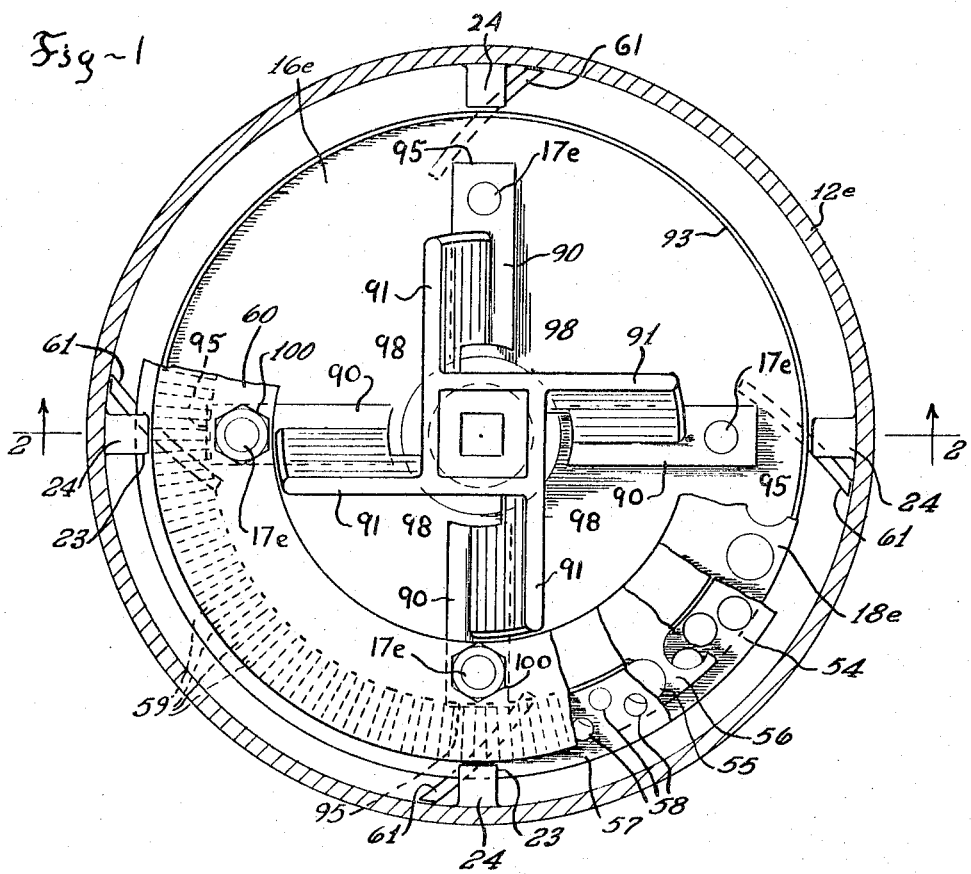

May 9, 1967  A. W. HUGHES  3,318,353

EMULSIFIER

Filed June 29, 1964

INVENTOR.
ALVIN W. HUGHES
BY N. R. Johns
Attorney

United States Patent Office 3,318,353
Patented May 9, 1967

3,318,353
EMULSIFIER
Alvin W. Hughes, 4 N. 194 Church Road,
Bensenville, Ill. 60106
Filed June 29, 1964, Ser. No. 378,857
3 Claims. (Cl. 146—192)

This invention relates to an improvement for an emulsifier for sausage of a general type disclosed in some of the embodiments of my prior application, Serial No. 299,656 filed August 2, 1963, now Patent 3,221,788 dated December 7, 1965 for Emulsifier and in my prior Patent 3,123,116 dated March 3, 1964 also for Emulsifier.

In practice it has been found some meat packers produce sausage emulsions of different compositions from other packers. During operation of an emulsifier of the type described in FIG. 16 of said Patent 3,221,788 it was found to function satisfactorily for many different kinds of sausage emulsions. However, at the plant of one packer it was found to function less satisfactorily for one of their higher viscosity types of sausage emulsions, handling such material at a less efficient rate of through-put and causing more heating of the product than was found with other grades. Perhaps the simplest solution for this difficulty was the design of a larger emulsifier with rings of larger radius to provide the additional centrifugal force necessary to push this heavier material through the apparatus at the desired rate, or to provide a higher speed of rotation for the heavy viscosity product than for the lower or less thick type. Neither of these palliatives was satisfactory to either the meat packer or the manufacturer of the emulsifier. What was desired was one piece of apparatus capable of producing all grades of sausage emulsions having different viscosities at the desired rate of operation without the expense of gearing to obtain speed variations needed or the expense of having to have two or more sizes of rings for obtaining variable degrees of centrifugal force. The need for reducing heat input to the sausage emulsions has been known for several decades especially for the heavier viscosity sausage emulsions without as satisfactory a solution as is this invention.

Investigation has shown that much friction existed in the radial feed passages of the head ring for supplying the material to be emulsified. Reduction in the number of such passages reduced friction but also reduced the cutting ability or output and the usefulness of the emulsifier. It was later found how to further reduce friction in such passages without reducing the cutting ability of the machine. Still later it was found how to not only reduce friction while maintaining a fair rate of output but also how centrifugal force might be slightly increased enough so that the old rate of output could be obtained for the heavier sausage emulsion viscosities within the limits of the previously used casing and with the old motor speed.

An object of this invention has therefore been to provide a much more efficient emulsifier and one which is capable of handling a wider range of sausage emulsion viscosities without the necessity for changing the overall size or speed of such emulsifier. A further object is to provide such a device capable of transmitting less heat input into the product when of higher viscosity grade of sausage thus reducing any tendency for the sausage emulsion to lose stability which would cause the finished product to become oily and less desirable for the consumer.

Another and yet further object is to provide an emulsifier capable of having a satisfactory out-put in both quantity and temperature and needing no other change than a quick and easy partial closing of a valve for the much lower viscosity sausage material.

The radial input or feed channels 29, 32, and 52 with their uniformly spaced side walls as shown in FIGS. 4, 5, 9 and 16 of said patent 3,221,788 were found to be a large source of energy loss by friction with heating of the product when emulsifying a high viscosity type material. Reducing the side wall friction was accomplished by substituting fewer such channels which have more widely diverging side walls. The input channels were reduced from 20 in said patent (see column 4 lines 72 and 73) to at least 4 in this invention. It has been estimated these frictional losses have been reduced approximately 40%. An increase in centrifugal force acting on the incoming material to be cut has been obtained of about 10% without any change in speed or size of the cutting rings by having bar spacer foot portions 90 extend beyond the clamping studs for such rings. About 300 pounds of sausage per minute has been obtained with the higher viscosity sausage.

Referring to the drawing FIG. 1 is an end view of the five ring improved embodiment of this invention with parts broken away to show the perforations in the intermediate rings.

Figure 2:
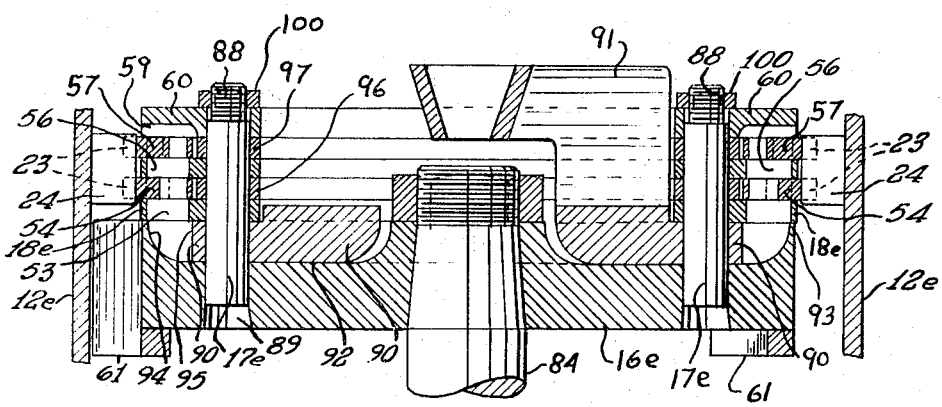

FIG. 2 is a section on the line 2—2 of FIG. 1.

The rotor head 16e is secured on the extension 84 of a motor driven shaft projecting downward in FIG. 2. This rotor head 16e has four studs 17e extending through it and drives at least three rotatable rings, 18e, 56, and 60 together with ring spacers 96 and 97 shown in section at the left in FIG. 2 and clamped in place by means of a nut 100 engaging screw threads 88. The lower or inner end of each stud has a taper 89, against which the thrust of a nut may be applied. Secured on shaft extension 84 are four bar type spacer foot portions 90 which are clamped against the outer recessed surface 92 of said rotor head 16e. Integral with spacer foot portions 90 are the input impeller vanes 91 rising at an angle of 15 degrees to a plane through an axis of extension 84 or at an angle of 75 degrees to the outer surface of foot portions 90 as shown in FIGS. 1 and 2. Parts 90 and 91 are preferably an integral casting of a non-corrosive material such as stainless steel. The peripheral rim 93 of rotor head 16e is shown as being formed by cutting out a central recessed portion of a size to receive the feet 90. An arcuate fillet 94 strengthens the rim 93 and serves to direct axially outwardly the emulsion input material away from the rotor head 16e after it has moved radially outward by centrifugal force. The feet 90 or spacing bars function to support rotatable rings 18e, 96, 56, 97, and 60 and guide the material radially outward over the smooth floor surface 92 of the rotor head 16e. Since the sides of feet form angles of substantially 90 degrees with each other, the widening or diverging path for incoming material offers much less friction to the outward movement of material, partially because of there being fewer walls and also for reasons not fully understood. Such material is thought to be moved radially outwardly largely by centrifugal force and without substantial tendency to move around an outer end 95 of spacer foot 90. Four output impeller vanes 61 are shown as being welded or cast onto the rotor head 16e in both FIGS. 1 and 2.

The rings shown in FIG. 2 include a perforate feed ring 18e having a plurality of ⅝ inch holes substantially contacting the rim 93 as shown in FIG. 1. This feed ring 18e is not like that shown in the aforementioned application. The holes in said ring 18e are drilled at a spacing of approximately 10 degrees between centers making a total of 36. Ring 18e is supported by spacer feet 90 and at its edge portion by the rim 93 of rotor head 16e. Unlike the feed ring of that prior application, the present one has no narrow radial channels. Instead, the incoming material is fed radially outward between the foot portions 90 and under feed ring 18e in the widely diverging channels 98 formed in the head and forming an angle of about 90 degrees between feet 90. The head 16e with ring 18e may be viewed together as a feed ring, the sides of the foot portions 90 forming between them the sides of the diverging input channels for the material being emulsified. The edges of the perforations in the ring 18e cooperate with edges of the perforations in the non-rotatable sizing ring 54 to assist in the shearing in suspension of the incoming material. Here ring 18e is also rotatable with and clamped to rotor head 16e by studs 17e and nuts 100.

Contiguous to feed ring 18e is non-rotatable primary sizing ring 54 having 60 holes ⅜ of an inch in diameter with their centers not all at the same radial distance from the ring axis, after the manner shown in FIG. 3 of the prior application. The notch 23 in ring 54 is for the purpose of receiving a stationary rib 24 secured to the inside of an enclosing casing 12e for the purpose of precluding rotation of ring 54. The clearance axially each side of sizing ring 54 is preferably between about 0.003 and 0.0005 of an inch maintained by spacer ring 96 enabling the sizing ring to be floating or axially shiftable slightly during operation between thin films of partially emulsified sausage material. As mentioned in that earlier application with clearance distances larger than about 0.005 of an inch it was found the strings in some kinds of sausage, though not in all kinds, were small enough to jam in between the rings and actually stop rotation of the emulsifier. These limits were selected because they were found best adapted for the production of all kinds of sausage emulsions found in industry today.

Next to and between the non-rotatable sizing rings 54 and 57 is the transfer ring 56 clamped on and driven by studs 17e and having ⅝ perforations 55 as were those in feed ring 18e. The second sizing ring 57 has 120 perforations 58, ⁷⁄₃₂ of an inch in diameter arranged in two rows. Each sizing ring is floating in operation as described and the spacing rings 96 and 97 are thicker than the sizing rings, said spacing rings being of the type shown in FIG. 12 of the prior application, to provide the desired clearance. When not operating, these sizing rings are free to rest on a clamped, rotatable ring next to it or under it when the axis of said rings is vertical or inclined. The rotatable discharge ring 60 is driven by studs 17e and clamped by nuts 100. The radial discharge recesses 59 are each made ³⁄₁₆ inch deep about ⅞ of an inch in radial length and about the same dimension in width. A view of such a discharge ring from the side toward which the emulsified material moves is shown in FIG. 6 of said prior Patent 3,221,788.

The operation of this emulsifier except for its reduced friction offered the material and the stronger centrifugal force imparted to the supplied material by the longer bar spacer or foot portions 90, is the same generally as that described in the later patent mentioned. The cutting, called shearing, is believed to be performed by the edges of the perforations or recesses past which the material moves as one recess in a rotatable ring moves over or across another recess or perforation in a non-rotatable sizing ring. Due to the spacing between these rotatable and non-rotatable rings, there is no large heat input to the material compared to what would happen were the rings in actual and frictional contact during operation. This type of shearing or cutting has been called shearing in suspension, i.e., that is when the particles being sheared are suspended and not rigidly held where the shear may occur between the shearing edges which are out of contact with each other. The shearing edges do not need as frequent sharpening as would be the case did they contact.

Reference numerals above 88 were not used in the prior application and those numerals below that number refer to somewhat similar parts in the earlier case. Those numerals having a lower case letter e refer especially to the embodiment in FIG. 16 of the Patent 3,221,788.

While much of the reduced friction in this embodiment is believed to be due to a substantial reduction in the number of radial side walls present in the feed channels here as compared with those in the aforementioned application, there is still believed to be substantial friction due to the remaining radial walls, ceilings under feed rings 18e and over floor 92 for the radially outwardly diverging channels through which the material is centrifugally moved. It is believed that the particles of incoming material may have less friction in any rubbing against one another than in moving in contact with a polished metal wall surface. Facilities for accurately checking these statements quantitatively are not available at this time.

The minimum value of 0.0005 of an inch for the thickness of a thin film of material between a rotatable ring and a non-rotatable sizing ring has been selected as an approximate spacing that may be obtained without running into too high a cost for commercial production of flat surfaces. Smaller spacings are obtainable where production cost is no factor. The preferred upper limit of about 0.003 of an inch was selected because this was a safe value found for all types of fresh sausage from various meat packers that were tried. The smallest spacing that was found unsatisfactory was 0.005 of an inch.

It is believed that as few as three diverging channels for the incoming material may be satisfactory but such should perhaps be slightly more expensive to produce than four.

Any suitable way for connecting the input impeller vanes 91 to the projection 84 of a driven shaft should be appropriate, so long as these vanes and spacer feet 90 are readily removable for cleaning.

In event a material of too low a viscosity is supplied, it is only necessary to partially close a valve (not shown) on the line from a chopper to this emulsifier to slow down the material supply as well as its rate of travel through this emulsifier.

Except for the need for cleaning and removal of the impeller vanes 91, and spacer feet 90, rotor head 16e may be considered as functionally integral and imperforate in use in that the material fed in does not move axially through the rotor head 16e but moves radially outward under centrifugal force through diverging side walled channels formed between the foot portions 90 and then through the rings mentioned. The head 16e has been recessed to a depth of about ½ an inch to provide ample size for the passageways for the centrifugally fed material between adjacent side walls of the feet forming an angle of about 90 degrees and diverging for each such passageway. The feet 90 serve to space the various rings above the floor 92 of the feed channels in this recessed rotor head 16e. One reason for recessing this rotor head 16e is to enable all the rings to operate within a compact enclosing casing.

Where the material being emulsified has a low enough viscosity more than four radial channels may be used each with side walls which diverge outwardly.

An advantage in the large axial input passageway is its usefulness for holding input impellers to impart substantial angular velocity to the incoming material to be emulsified. The embodiment illustrated may be said to be an emulsifier with four cutting or shearing stages, one on each face of a sizing ring, although of course there may be more or less such stages. The increase in radial flow of material accounts for the increase in centrifugal force resulting from the slightly longer side walls to the spacer foot portions 90 extending beyond the studs 17e. The thin film on each face of a sizing ring continually collects and is discharged during operation.

The herein original patent drawing is approximately to scale and half size.

What is claimed is:

1. In an emulsifier of the multi-ring type for shearing in suspension particles of sausage and other materials and including at least two rotatable concentric rings between which is placed a non-rotatable perforate sizing ring out of contact with said rotatable rings during operation, each of said two rotatable rings having radial passageways through which the material being sheared in suspension may be centrifugally moved, one of said rotatable rings being a feed ring and the other a discharge ring, the radial passageways in said feed ring having the radial outer ends of such passageways closed to direct the fed material toward perforations in said sizing ring, the radial inner end portions of said passageways in said feed ring being open, the discharge ring having the radial outer ends of its passageways open for the discharge of material, and a substantial length of its passageways open for reception of material discharged by perforations of said sizing ring, clamping studs radially within an inner edge of said sizing ring and by means of which said rotatable rings are held in alinement, at least one of said multi-rings being a spacing member, said spacing member having portions functioning as side walls of radial guide channels for said feed ring through which material is centrifugally moved radially outwardly, and a drive shaft to which said rotatable rings are connected for rotation, the combination therewith of the improvement for reducing the friction between the side walls of the radial channels through which material being sheared is supplied by said feed ring, said improvement including: (a) the number of such radial feed channels being reduced below twenty and to at least four, (b) the side walls of such feed channels diverging radially outward, (c) the side walls of at least some of said channels forming an angle of about 90° to other of said channel side walls, and (d) at least some of those side walls being to one side of said clamping studs and extending radially beyond the axis of said studs by a substantial amount to enhance the centrifugal thrust imparted to the material being emulsified.

2. An apparatus according to claim 1 in which impeller vanes are mounted on those channel side walls extending radially inwardly from adjacent the radially inner edge of said sizing ring.

3. An apparatus according to claim 2 in which there are at least three rotatable rings and two non-rotatable sizing rings, there being one sizing ring between each pair of rotatable rings.

References Cited by the Examiner

UNITED STATES PATENTS 3,123,116   3/1964   Hughes _____ 146—192

WILLIAM W. DYER, Jr., *Primary Examiner.*

W. GRAYDON ABERCROMBIE, *Examiner.*